: US 10,462,541 B2
(45) Date of Patent: Oct. 29, 2019

(12) United States Patent
Frackelton et al.

(54) DETERMINATION AND RENDERING OF SCAN GROUPS

(71) Applicant: Keithley Instruments, LLC, Cleveland, OH (US)

(72) Inventors: Brian P. Frackelton, Macedonia, OH (US); George J. Polly, Brecksville, OH (US); Lawrence J. Kizlik, Eastlake, OH (US)

(73) Assignee: Keithley Instruments, LLC, Solon, OH (US)

( * ) Notice: Subject to any disclaimer, the term of this patent is extended or adjusted under 35 U.S.C. 154(b) by 231 days.

(21) Appl. No.: 15/469,379

(22) Filed: Mar. 24, 2017

(65) Prior Publication Data

US 2018/0278489 A1 Sep. 27, 2018

(51) Int. Cl.
*H04Q 9/00* (2006.01)
*G06F 3/0481* (2013.01)
*H04L 12/26* (2006.01)
*G06F 3/0483* (2013.01)

(52) U.S. Cl.
CPC ........... *H04Q 9/00* (2013.01); *H04L 43/50* (2013.01); *G06F 3/0483* (2013.01); *G06F 3/04817* (2013.01); *G06F 2203/04803* (2013.01); *H04Q 2209/84* (2013.01)

(58) Field of Classification Search
CPC ...... H04Q 9/00; H04Q 2209/84; H04L 43/50; G06F 3/04817; G06F 3/0481; G06F 3/0483; G06F 2203/04803
See application file for complete search history.

(56) References Cited

U.S. PATENT DOCUMENTS

| | | | |
|---|---|---|---|
| 6,732,061 B1 * | 5/2004 | Wichelman | H04W 52/34 702/122 |
| 6,785,540 B1 * | 8/2004 | Wichelman | H04L 41/22 455/423 |
| 2002/0111753 A1 * | 8/2002 | Moch | G06F 11/24 702/57 |
| 2003/0036872 A1 * | 2/2003 | Stark | G01R 23/18 702/123 |
| 2010/0199202 A1 * | 8/2010 | Becker | G06F 3/0481 715/771 |

* cited by examiner

*Primary Examiner* — Manuel L Barbee
(74) *Attorney, Agent, or Firm* — Miller Nash Graham & Dunn; Andrew J. Harrington

(57) ABSTRACT

The determination and rendering of scan groups for channels configured to acquire data from test and measurement devices in a data acquisition system is disclosed. Based on the particular scan configuration for the data acquisition system, scan groups may be determined for channels in a scan list based on the channel settings, such as measurement type, for example. The data acquisition system renders a graphical scan summary of the channels in the scan list according to their determined scan groups on a display, allowing a user to quickly review the scan configuration.

20 Claims, 8 Drawing Sheets

DETERMINATION AND RENDERING OF SCAN GROUPS

FIELD OF THE INVENTION

This disclosure is directed to configuring scans for data acquisition systems with test and measurement devices, and, more particularly, to determining and rendering scan groups from configured channels in a data acquisition system.

BACKGROUND

A test or measurement instrument is a device that collects data from a system being tested or measured and that may also analyze and process the data collected. These devices may be stand-alone or connected together to form a network of test and measurement instrumentation. Data acquisition (DAQ) systems and data loggers receive signals from test and measurement instrumentation and store the information from the signals in memory over time. By recording the information from the different signals organized according to each signal source and the time recorded, changes in the measured properties of the system can be observed and analyzed. This recordation may be automatically programmed using a scan setup to acquire specifically sequenced signal data over time.

Conventional DAQ systems utilize block diagrams and flow charts in their user interfaces to virtually depict the test and measurement device architecture, programming sequence, or scan progress in a general sense. These previous systems, however, lack in usability, with respect to ease and efficiency, and in clarity, with respect to specific instrument tasks and configuration.

Embodiments of the invention address these and other deficiencies in conventional systems.

DETAILED DESCRIPTION

Figure 1:
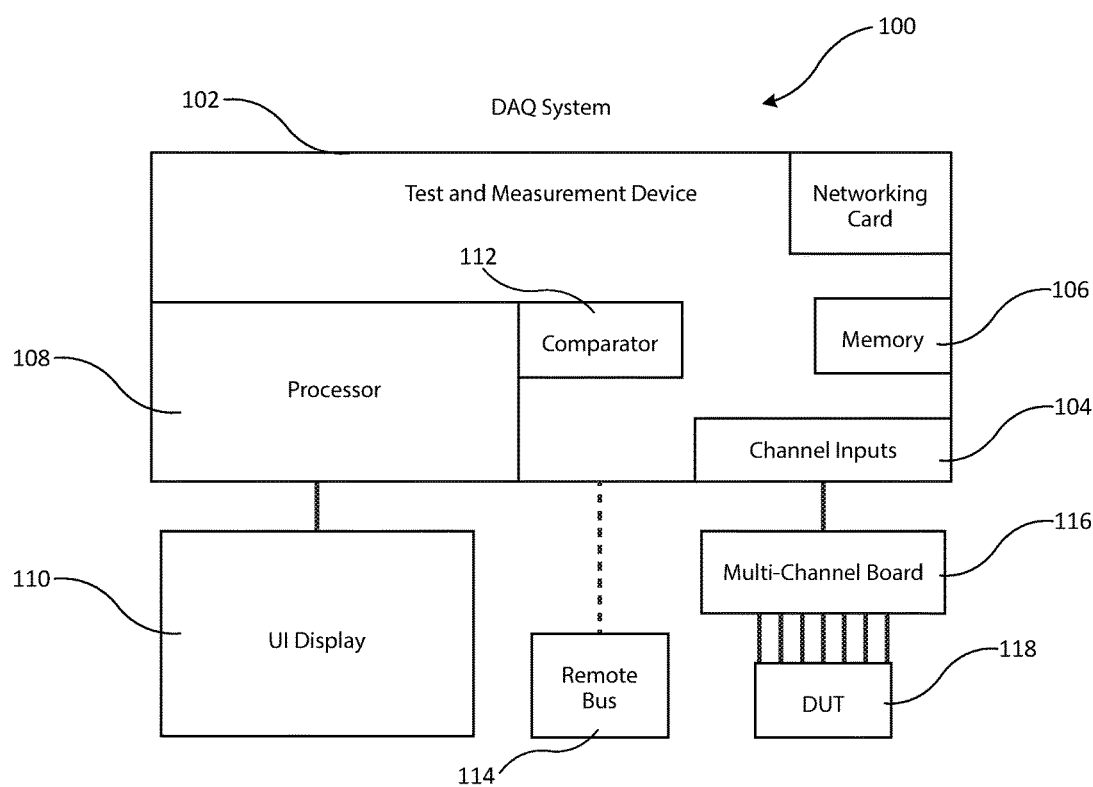
FIG. 1 is a block diagram of an example system setup for a data acquisition system with a test and measurement device, according to embodiments of the present disclosure.

Example data acquisition (DAQ) systems, including stand-alone DAQ instruments, data loggers, and multi-channel switch units, required a scan list of any channels desired to be scanned to be manually set up by a user before initiating a scan. When performing a scan, the DAQ systems cycled sequentially through the channels set up in the scan list and stored the measurements collected from each according to the associated channel settings using an internal digital multimeter (DMM) or an external instrument. Channels not in the scan list were skipped, and the measurements taken during the scan were automatically time stamped and stored for later analysis. Setting up a scan depended on the test and measurement system architecture and could range from the simplest single channel measurement to incredibly complex systems with a vast array of channels and multi-signal measurements. Typically, scans included more than 40 channels, making manual channel selection tedious for the user. To have manual control in these example DAQ systems, the user had to step through a scan channel by channel. Specifically, the user had to verify that a multi-channel card was set up and wired correctly before a scan by manually closing channels and taking a series of measurements.

Some example DAQ systems moved the functions required to set up a scan configuration to a dedicated scan mode screen. In scan mode, the user simultaneously sets up the channel settings and explicitly specifies which channels to include in the scan list for the scan configuration. In particular, the user must explicitly call out which channels to include in the scan list in scan mode, since all channels may not be connected to hardware, and the scan should be limited to only the desired channels. To explicitly configure the scan the user may have used checkboxes or a wizard, for example, to individually select and/or deselect the channels to include in the scan list.

Some DAQ systems may have attempted to display the channels of the test and measurement devices in a chart or list, however, charts of hundreds of channels are not easily navigable for the user. Simply rendering a separate item for each of the channel may have seemed straightforward, but this becomes very problematic in scan configurations with hundreds of channels.

When a scan was configured on the example DAQ systems by requiring the user to explicitly select each channel and channel setting, a rendering of the channels in the scan list may have been simple since they were explicitly defined by the user during configuration. Scan configurations and channel settings may have also been configured partially or entirely on a remote bus, however. Traditional test and measurement instruments only allowed scan configurations to be customized over a remote bus to avoid complications that arose when dealing with interactions and contradictions between remote and front panel interfaces. Further, the scan configuration and channel settings of the test and measurement devices may have been changed on the user interface (UI) of the example DAQ systems independently from the initial scan configuration.

The DAQ system of the present disclosure allows a user to configure a scan for a test and measurement device in an improved manner. In contrast to the above example DAQ systems, however, the present DAQ system allows the user to configure a scan implicitly. The DAQ system may infer what was intended by the user based on manual channel interactions during a debug mode, where the above example DAQ systems require the user to perform an explicit step clearly identifying whether a given channel should be included in a scan. The DAQ system may automatically include in the scan list any channels with which the user interacted during debug mode. The channel settings associated with these automatically included channels are retained as well. In this way, a scan may be fully configured without any explicit prompts to the user. Because the above example DAQ systems' procedures include manually stepping through channels and configuring the channel settings in a debug mode, and then additionally manually selecting channels and the corresponding channel settings during a scan configuration mode, presenting the inferred channel selections and channel settings to a user without requiring the user to manually configure the scan allows for a much better user experience.

Additionally, the present DAQ system may automatically render a summary of the scan configuration in a way that is easily understandable to the user through generating the organizational schema of selected channels within scan groups and displaying the result. The comparator compares the channel settings for each channel in the scan list of the scan configuration. The processor generates a group assignment for each channel in the scan list based on the channel settings for each channel, such as channel settings related to measurement type, range, transducer type, and timing, for example. Channels with the same or similar channel setting values are automatically grouped together in a scan group. The DAQ system then renders on the display a graphical summary of the scan with one or more group icons representing each group assignment for the channels in the scan list of the scan configuration.

Further, the processor may generate for each channel in the scan list a subgroup assignment based on the group assignment and the channel settings for each channel, such as channel settings related to maximum and/or minimum limits, and/or channel label, for example. And the DAQ system may further render on the display the graphical summary of the scan further including a subgroup icon adjacent each group icon representing channels with differing subgroup assignments. The icon indicating that non-identical channels are in the scan group may be selected by the user to expand the scan group and render any scan subgroups within the scan group containing channels with varying channel settings. The DAQ system may further include a numerical algorithm allowing similar numbers to be approximated to retain compact groupings and avoid the unnecessary creation of scan subgroups. The comparator may compare a difference, between differing channel settings, against a divergence threshold, such that unless the difference is greater than the divergence threshold, the channels with differing channel settings share the same subgroup assignment generated with the processor. In this way, the DAQ system increases usability of UI by determining and rendering scan groups of channels.

To address the issues of the conventional DAQ systems, the present DAQ system properly depicts a scan in a simple and intuitive way regardless of how the scan was configured. A scan configuration may contain very simple or diverse and complicated settings. The DAQ system receives from memory and/or control signals a scan list of channels to be scanned as well as the channel settings for each channel in the scan list. The DAQ system may receive the channels and/or channel settings from the memory based on manual interactions with the test and measurement device during a debug mode. The DAQ system may re-render the graphical scan summary on the display every time a channel setting or the scan configuration is altered, either locally on the test and measurement device and/or through a remote bus. The rendering of the graphical scan summary works for any complexity of scan configuration, including those in which a remote bus, a stand-alone DAQ instrument, and/or other test and measurement devices are part of the system.

A DAQ system 100, as seen in FIG. 1, may be in communication with various test and measurement instrumentation or devices for collecting data from a system being tested or measured, unit under test (UUT), or device under test (DUT) 118. The DAQ system 100 shown in FIG. 1 includes a test and measurement device 102, such as a DMM or stand-alone data logger, for example. The DAQ system 100 may be in communication with a bus, either internal or external, such as a micro channel bus, a backplane system with D-sub communication ports, or a computer-aided measurement and control (CAMAC) bus, for example, which provides one or more communication channels along which signals may travel.

The test and measurement device 102 of the DAQ system 100 is in communication with a multiplexer or multi-channel switch, card, or board 116 that includes terminals or pins for connecting sensors or other transducers to the DUT 118 for taking various measurements of the DUT 118. The test and measurement device 102 includes channel inputs 104 for receiving measurement signals from the channels wired to the transducers on the multi-channel board 116. The DAQ system 100 may include various virtual or mechanical actuators and/or signal conditioning modules or equipment for controlling the measurement signals from the test and measurement device 102 and/or transducers connected to the DUT 118. Closing a particular channel on the multi-channel board 116 allows the test and measurement device 102 to receive the measurement signals from the transducer connected to that particular channel.

To acquire the measurement data from the transducers attached to the DUT 118 over time, the DAQ system 100 allows for a scan to be configured. The DAQ system 100 and/or the test and measurement device 102 also includes a processor 108, which controls the operation of the DAQ system 100 and/or the test and measurement device 102, such as generating the scan configuration based on user inputs. The scan configuration and other data (e.g., data related to measurement signals received via the channel inputs 104 and/or data related to channel settings and/or scan configuration) may be stored in a memory 106 of the DAQ system 100. The memory 106 may be solid state memory, random access memory (RAM), or flash memory, for example. When running a configured scan, the DAQ system 100 programmatically cycles through specified channels at preset times and takes measurements from the transducers connected to the channels on the multi-channel board 116 through the channel inputs. The DAQ system 100 compiles the measurement data collected through the channel inputs 104 and stores the data for later analysis. The DAQ system 100, test and measurement device 102, and/or processor 108 includes a comparator 112 for comparing channel settings and/or stored data in the memory 106.

The DAQ system 100 includes a UI display 110 for graphically rendering various screens to aid the user in setting up scan configurations and channel settings through user interactions with the display 110 and to show the digital output values of measurement signals received via the channel inputs 104. The display 110 may be a touchscreen interface for allowing the user to interact with the DAQ system 100. Additionally or alternatively, the DAQ system 100 may include a stylus, cursor, keypad, and/or other similar device for interacting with the display 110 through an input/output (I/O) interface, which facilitates and optionally translates signals input and output between the DAQ system 100 and peripheral components.

The I/O interface of the DAQ system 100 may include network adaptors, such as a 10/100 Base-T Ethernet adaptor, and IEEE 802.1x wireless transceiver, for example, to enable communication of data between the DAQ system 100 and a network. The DAQ system 100 and/or the test and measurement device 102 may be in communication with a remote bus 114 (e.g., GPIB, Ethernet, or USB), which may include a UI display for remotely interacting with the DAQ system 100. The remote bus 114 may provide wireless control over the DAQ system 100 and/or the test and measurement device 102 over a local and/or external network. For example, the remote bus 114 may send control signals to the test and measurement device 102 that change the channel settings or scan configuration, using known command sets (e.g., Standard Commands for Programmable Instruments (SCPI) programming language) input by the user. Additionally or alternatively, the remote bus 114 may provide UI buttons and/or other selectable icons and/or menus that bring about the same resulting control signals and/or control over the DAQ system 100 and/or test and measurement device 102.

The DAQ system 100 allows a user to configure channel settings for each of the available channels on the multi-channel board 116. Each channel may have a set of channel settings associated with the channel. Each channel setting may be a certain type of setting, such as function or measurement type, label, maximum, minimum, range, and transducer type, for example. The measurement type is based on the type of physical measurement being taken along the channel, such as voltage, current, temperature, strain, and count, for example. The user may also add a custom channel setting type to the set of channel settings for a channel in addition to the automatically provided channel settings. Each type of channel setting may have a set of values to choose from and/or may have the value customized by the user. For example, the channel setting for maximum and/or minimum may be set to a certain measurement value, while the channel setting label may be set to any alphanumeric string input by the user. Each type of channel setting may have default values, automatically set by the DAQ system 100.

The number and type of channel settings generated by the DAQ system 100 may be based on the values of other channel settings and/or scan configuration. For example, if a channel has never been closed or configured by the user and/or is not in the scan list for the scan configuration, the DAQ system 100 may have no channel settings associated with the channel. Alternatively, if the user sets the measurement type of the channel as DCV as well as particular values for the channel settings range and maximum, for example, but then excludes the channel from the scan list, the DAQ system 100 may preserve the channel settings in the memory 106. As another alternative, channel settings associated with a channel may be based primarily on the measurement type configured by the user. For example, if a channel is set with temperature as the measurement type, additional channel setting types may be automatically generated by the DAQ system 100 for the channel and set to default values, which may be changed by the user, such as thermocouple for transducer type, type K for thermocouple wire type, degrees for measurement unit, etc. Additionally, the DAQ system 100 may generate and/or change the channel settings, which were initially generated based on the user's selection for measurement type, in response to the user changing another channel setting from the default value. For example, after initially setting the measurement type to temperature, as described above, the user may change the default value of transducer type from thermocouple to thermistor, and in response, the DAQ system 100 will change the channel setting for thermocouple wire type to the channel setting for thermistor type and apply the default value.

In operation, the DAQ system 100 uses the channel inputs 104 to receive measurement signals across the channels and shows the resulting measurements in real-time on the display 110. The DAQ system 100 can be configured to store the measurements received via the channel inputs 104 over time by performing a scan based on a scan configuration (i.e., cycling through certain channels and taking measurements based on channel settings). During the scan, the DAQ system 100 cycles through specific channels at preset time intervals and stores the measurement results in accordance with the channel settings. The scan configuration includes a scan list of which channels are to be scanned and their respective channel settings, as well as other information related to timing, the number of cycles, and data storage.

The channels selected in the scan list for a particular scan configuration need not be explicitly selected by the user while configuring a scan, which is often a tedious and time-consuming task in setting up a scan in the example DAQ systems mentioned above. Rather, the DAQ system 100 may automatically infer the list of channels selected for a scan and the respective channel settings based on the user's manual channel interactions during a debug mode of the DAQ system 100.

In particular, after the multi-channel board 116 of the DAQ system has been set up and built with terminal connections connecting to particular transducers, as desired, for test and measurement of the DUT 118, users typically walk through each channel to confirm the correct wiring and set up channel settings in debug mode. This debug mode occurs when the user manually closes a channel, making the channel active, and then takes real-time measurements using the test and measurement device 102, during which the user may change the channel settings of the DAQ system 100. The user may use debug mode to confirm the connections during the initial setup and wiring of the test, as well as during any further debugging that may be required. Operating the DAQ system 100 manually in the debug mode differs and is outside of operating the DAQ system 100 a scan mode, in which the DAQ system 100 automatically cycles through the channels and takes measurements. The DAQ system 100 may automatically determine that the user is operating in debug mode based on the user's manual interactions with the channels and/or channel settings outside of automated scanning. Additionally or alternatively, the DAQ system 100 may determine that the user is operating in either debug or scan mode based on the particular screen printed on the display 110 and/or menu option selected by the user. Based on the determination that a user is operating in debug mode, the DAQ system 100 may record the user's interactions with the DAQ system 100 and/or test and measurement device 102 and store a log in the memory 106. Additionally or alternatively, the DAQ system 100 may change the scan configuration or channel settings in response to the user's interactions in debug mode and store these changes in the memory 106.

The DAQ system 100 may use the information stored in memory 106 based on the user's manual interactions with the channels during debug mode to infer the user's channels of interest. To determine the user's channels of interest, the DAQ system 100 may keep track of which channels the user has manually closed, as well as the channel settings associated with the use of these channels during the debug mode. For example, a user may close channel 501 and take a DCV measurement using the test and measurement device 102 to confirm the proper settings and wiring. Then, the user may select and configure channel 502 with another measurement type, close channel 502 to take a measurement, and then adjust other channel settings, such as the autozeroing or offset, for example, so that the measurement signals are properly conditioned for the automated scan. This user selection and configuration of the channels and channel settings may be performed from various UI screens. Whichever UI screen is used for debug mode, there is no mention or need to configure a scan list in a scan mode independent of the user interacting with the test and measurement device 102 in a manual way during this debug mode. During and/or after these manual checks in debug mode, the processor 108 may immediately and/or concurrently generate a scan list (automatically including channels 501 and 502, since the user interacted with these two channels), instead of having to prompt the user to manually select which channels should be included in the scan list.

Thus, the DAQ system 100 may automatically populate the channels in the scan list for the scan configuration with the channels of interest determined from debug mode. This automated generation of the scan list saves the user from having to perform an explicit channel selection for the scan configuration, adding to the efficiency and convenience of the user.

The DAQ system 100 may generate the scan configuration in various ways. As an alternative to the fully automated example above, the DAQ system 100 may optionally include a prompt or interaction to configure the scan, where the interaction does not require manual selection of the channels to be included in the scan list. As another example, a scan configuration may be built up automatically in the background continuously without any determination of whether the test and measurement device 102 is in debug mode. So, to run a scan, the user simply starts the scan by pushing the "Initiate Scan" button, but never has to visit any scan screen or perform any configuration steps at all. In yet another example, the processor 108 may generate a scan configuration in response to the user invoking a one-step operation. In the one-step operation, the user verifies the desire to create a scan through an automatic setup, using a button such as "Auto Learn", "Auto Configure", or "Auto Set Scan", for example. After selecting the button, the DAQ system 100 implicitly creates the scan configuration.

Even if the user elects to manually select the channels for the scan list of a scan configuration, the DAQ system 100 may carry over the channel settings inferred from the user's manual interactions during the debug mode. For example, if the user selects certain channels manually, the DAQ system 100 may determine using the comparator 112 that the manually selected channels have been set up with some identical channel settings, in response to which the processor 108 may prompt the user for permission to automatically apply these channel settings to the selected channels, rather than requiring the user to manually set up the channel settings for all the channels selected by the user.

Further, although the DAQ system 100 may automatically infer the scan configuration based on the user's manual interactions with the channels and test and measurement device 102, the user may still make additional changes to the scan configuration. For example, the user may add or remove channels from the scan list, which was automatically generated by the processor 108. Thus, even without completely eliminating the scan configuration step, the DAQ system 100 may save the user time by only requiring the selection of changes, rather than the selection of every single channel and corresponding channel settings. For example, if the user only manually closes channels 501-509 during the debug mode, the processor 108 would automatically include those nine channels in the scan list of the scan configuration, and if the user reviews the scan configuration and desires to additionally include channel 510 in the scan, the user simply adds a single channel explicitly to the scan configuration. Thus, the DAQ system 100 improves the user experience by automatically inferring the user's intentions regarding a scan based on the user's interactions with the test and measurement device 102 during debug mode.

The UI shown on the display 110 of the DAQ system 100 may be classified according to the user functionalities into three different channel-related screens: (1) a settings screen 120, (2) a control screen 130, and (3) a scan screen 200. The different screens may be selected by a user from a main menu, settings menu, and/or home screen, for example. These three screens (i.e., the settings screen 120, the control screen 130, and the scan screen 200) for the display 110 of the DAQ system 100, as well as other screens with additional UI features, allow the user to configure a scan using either debug mode or scan mode in many ways. By providing various, separate screens for the UI display 110 and redundant methods of carrying out a task, the DAQ system 100 may better cater to a specific user's need.

Figure 2:
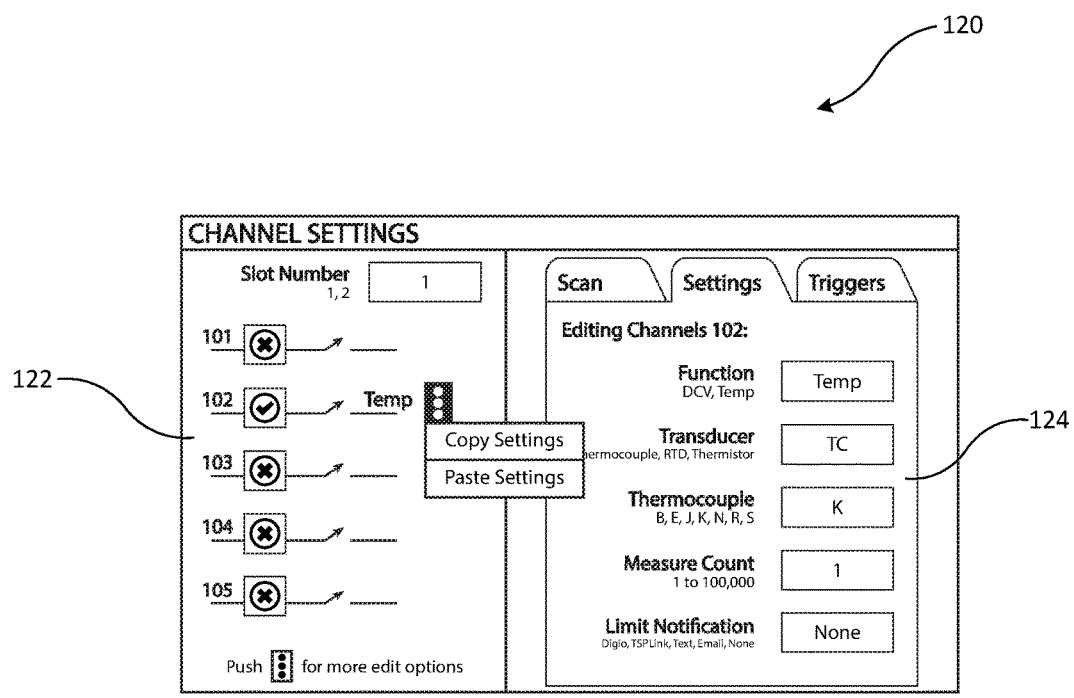
FIG. 2 is a depiction of an example user interface displaying a channel settings screen with a channel summary section and a channel settings detail section, according to embodiments of the present disclosure.

In the settings screen 120, an example embodiment of which is shown in FIG. 2, the UI may focus on the channel settings through quickly identifying which channel settings are tied to each channel in a channel summary section 122 and allowing for changes to be made in a channel settings detail section 124 of the screen. From the settings screen 120, the user can configure the channel settings for one or more channels at a time. Other screens may also be used to configure channel settings, such as a real-time measurement screen or a home screen (not shown), for example, on which the channel settings for the actively closed channel may be displayed in a pop-up or side menu display, toggleable by the user. The channel summary section 122, shown on the left portion of the UI for the settings screen 120 in FIG. 2, may include a listing of all the channels associated with a particular multi-channel board 116 connected through the channel inputs 104. From the channel summary section 122, the user can quickly select channels to edit in the channel settings detail section 124 and/or review which channels have been selected to edit according to checkboxes or other similar indications. When multiple channels with differing values for a particular channel setting are selected for editing in the channel summary section 122, the channel detail section 124 may display the value of the particular channel setting as "Various", for example, or another similar indication. The channel summary section 122 can also be used to review the open or closed status of the channels and the measurement type set for each channel in the channel settings. Adjacent a particular channel in the channel summary section 122 of the settings screen 120, there may be a selectable menu icon, giving the user the option to copy and/or paste the channel settings for that channel.

Figure 3:
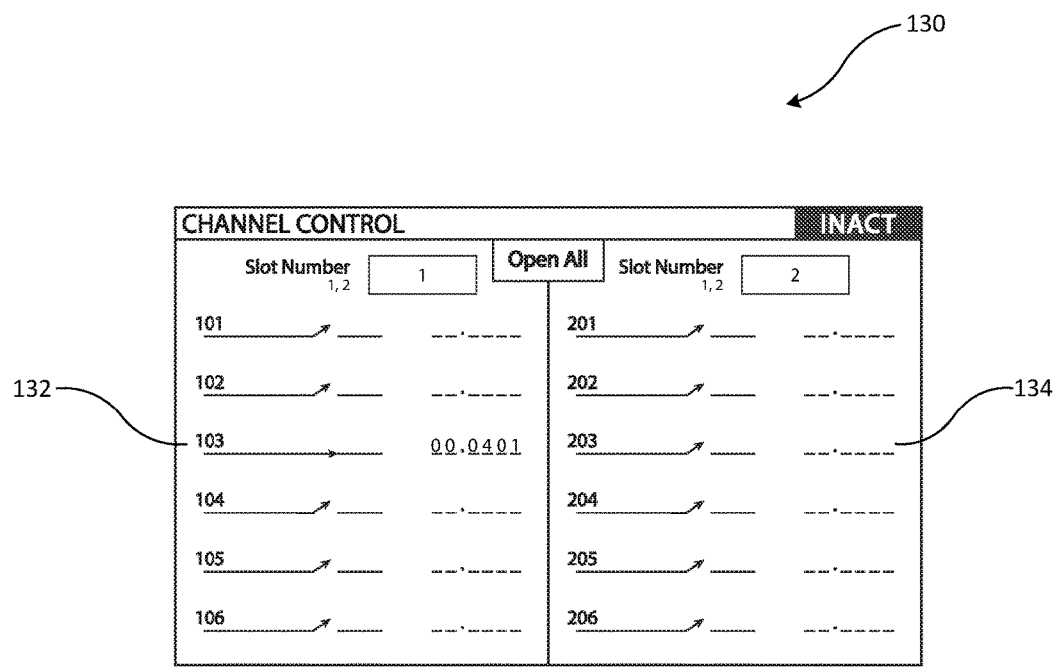
FIG. 3 is a depiction of an example user interface displaying a channel control screen with channel icons and digital measurements, according to embodiments of the present disclosure.

In the control screen 130, an example embodiment of which is shown in FIG. 3, the UI may focus on the channels and measurement signals through identifying the open or closed status of all the channels on each multi-channel board 116 using a channel icon 132 and displaying a real time digital measurement value 134 corresponding to each channel. From the control screen 130, a user can manually open and close a channel in debug mode, independent of any scan, by selecting the channel icon 132 for that channel, which sends a command through the DAQ system 100 to switch the channel between an open and closed status. Control over the channel's open or closed status may also be through other types of user interaction, such as a menu option or command sent from a remote bus, for example. The channel icon 132 may also depict matrix and/or 4-wire configurations for the channels in communication with the DAQ system 100 through the channel inputs 104. When a channel is closed, the corresponding digital measurement value 134 adjacent the channel icon 132 may display the current measured value, as seen in FIG. 3 for channel 103. Additionally, when a channel is closed but does not yet have any channel settings configured, the user may receive a prompt, pop-up menu, or other indication on the control screen 130 alerting the user and allowing basic channel settings to be configured for the closed channel. This debug mode functionality of allowing the user to manually select channels to be opened or closed may also be utilized and displayed as part of the toggleable pop-up or side menu display discussed above.

Figure 4:
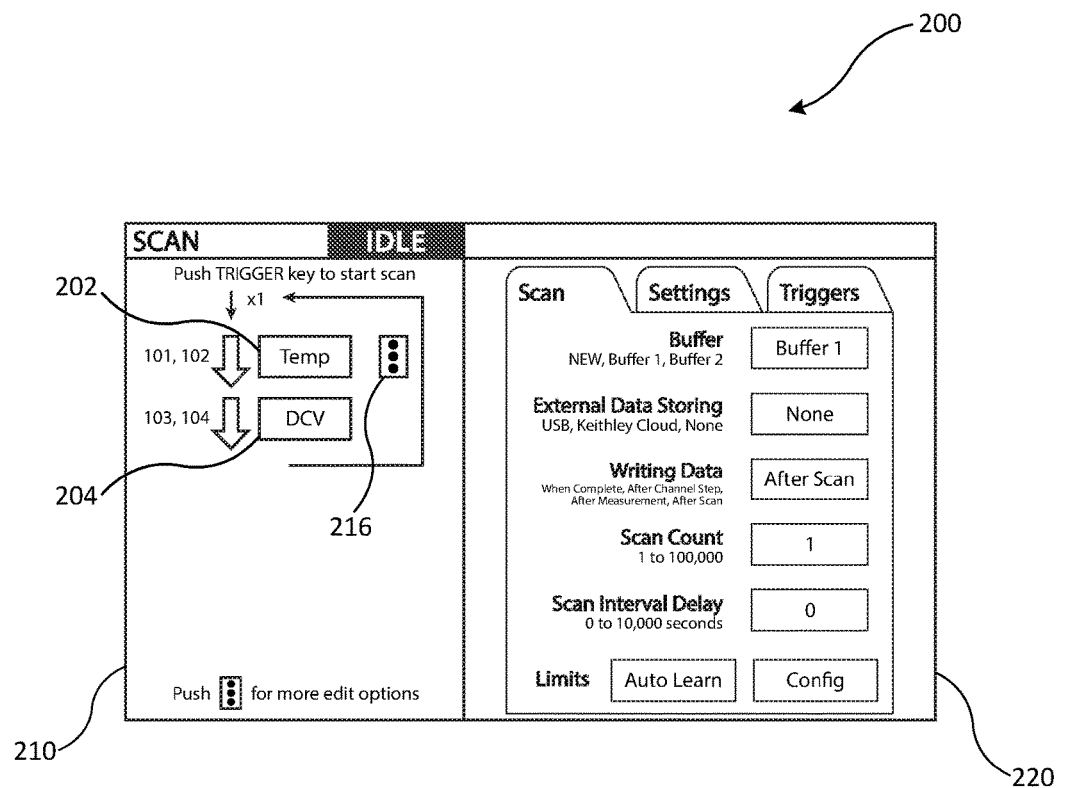
FIG. 4 is a depiction of an example user interface displaying views of a graphical scan summary according to scan groups and a scan configuration summary, according to embodiments of the present disclosure.

In the scan screen 200, an example embodiment of which is shown in FIGS. 4-7, the UI may focus on helping users set up a scan through rendering a graphical scan summary 210, as shown on the left in FIG. 4, and a scan configuration view 220, as shown on the right in FIG. 4. The scan screen 200 combines some of the capabilities of both the settings screen 120 and the control screen 130, discussed above. From the scan screen 200, the user can quickly review the sequence of channels that will be closed and then have measurements taken using the specific channel settings during a scan according to the scan configuration. The scan configuration information may contain a scan list of all the channels selected for the scan and their corresponding channel settings, as well as additional configurable parameters. The scan configuration view 220 may display the configurable parameters for the scan, such as buffer, external data storage, when to write the data, scan count, delay between scans, and the limits for the scan, for example.

On the scan screen 200 as shown in FIG. 4, the DAQ system 100 may generate the graphical scan summary 210 automatically based on the channels in the scan list and the corresponding channel settings of the scan configuration. Specifically, the DAQ system 100 programmatically reviews the scan configuration for the scan, including receiving both the channels in the scan list and their corresponding channel settings and grouping them together into scan groups. The scan configuration includes information indicating the channels in the scan list and the corresponding channel settings. The scan configuration may be inferred during debug mode and/or explicitly set by the user from the scan screen 200 or elsewhere. If the scan configuration is not yet set, the graphical scan summary 210 may initially be blank and then re-render as channels are added to the scan list and channel settings are configured. The scan groups are groupings of channels in the scan list generated by the processor 108 based on channel settings. Using the scan groups generated by the processor 108, the graphical scan summary 210 of the scan screen 200 may be rendered on the display 110 of the DAQ system 110 allowing the user to quickly review the scan configuration. To reduce the complexity on the scan screen 200 and increase usability of the DAQ system 100, the graphical scan summary 210 displays every channel in the scan list all at once by consolidating the channels down according to scan group. The DAQ system 100 may then speed up the process of configuring a scan for the user by organizing channels in the scan list hierarchically according to the particulars of the corresponding channel settings and visually communicating comprehensive information about the scan in an efficient manner.

The channel settings for a channel may include those that are considered primary. The primary channel settings for a scan group are channel settings that are desired to be unique to that particular scan group, such as measurement type, for example. Thus, the DAQ system 100 will generate a new scan group for every primary channel setting value that is divergent—that is, not identical (or similar)—from the other primary channel setting values.

The example embodiment of the scan screen 200 in FIG. 4 shows the graphical scan summary 210 depicting a very simple four-channel scan configuration. The scan list of the scan configuration includes channels 101, 102, 103, and 104. The channels have been set up with the measurement type channel setting as either temperature or DCV. As can be seen in FIG. 4, channels 101 and 102 share the same measurement type, temperature, and channels 103 and 104 share the same measurement type, DCV. Based on the measurement types for each channel, the DAQ system 100 will determine that there should be two scan groups, having the primary channel setting values of temperature and DCV, respectively. The processor 108 and/or the comparator 112 may determine whether the values of a particular channel setting for two channels are divergent. In the scan configuration example of FIG. 4, the channels with identical (or similar) channel setting values are grouped together in scan groups 202, 204 according to the measurement type of the channels. Having been rendered on the display 110, the scan groups of channels are visually depicted in common blocks 202, 204, as shown in FIG. 4.

Additionally or alternatively, the DAQ system 100 may look to multiple primary channel settings to determine the scan groups for channels in the scan list. For example, the processor 108 of the DAQ system 100 may generate a different group assignment for each measurement type and transducer type, such that even channels with temperature as the value of their measurement type may be split into different scan groups based on those using an RTD as their transducer type and those using a thermistor as their transducer type. Which channel settings are primary may be according to the automatic channel setting generation discussed above, where the DAQ system 100 changes the number and type of channel settings in response to the values selected for primary channel settings.

The graphical scan summary 210 also includes an editing icon 216, as seen in FIG. 4, that may be selected by the user to edit the scan groups or channel settings of the scan configuration. As the user makes changes to the scan configuration using the editing icon 216 menu, the DAQ system 100 automatically re-renders the graphical scan summary 210 to reflect the user's changes as they are applied. Moreover, the DAQ system 100 renders the graphical scan summary 210 based on the scan configuration and channel settings, regardless of how the scan configuration was built up. That is, the DAQ system 100 may receive data regarding the scan configuration and channel settings from the user's interactions with the DAQ system 100 on the local display 110 and/or other user input device, and from programming through the remote bus 114. Likewise, the scan list for a scan configuration can be set up in many ways, including (1) programmatically over the remote bus or interface 114, (2) interactively from the UI of the DAQ system 100, and (3) implicitly with the automatic inference feature of the DAQ system 100, described above. The scan configuration or channel settings may be changed from the UI of the DAQ system 100, such as from the scan configuration view 220, for example, using selections made by the user. The DAQ system 100 automatically detects these changes and renders scan groups in the graphical scan summary 210, even where not explicitly defined. The DAQ system 100 may transmit signals corresponding with user inputs to the test and measurement devices 102 specifying scan configuration information. Additionally or alternatively, the DAQ system 100 may receive signals from the test and measurement device 102 specifying the scan configuration information that has already been set up.

Figure 5:
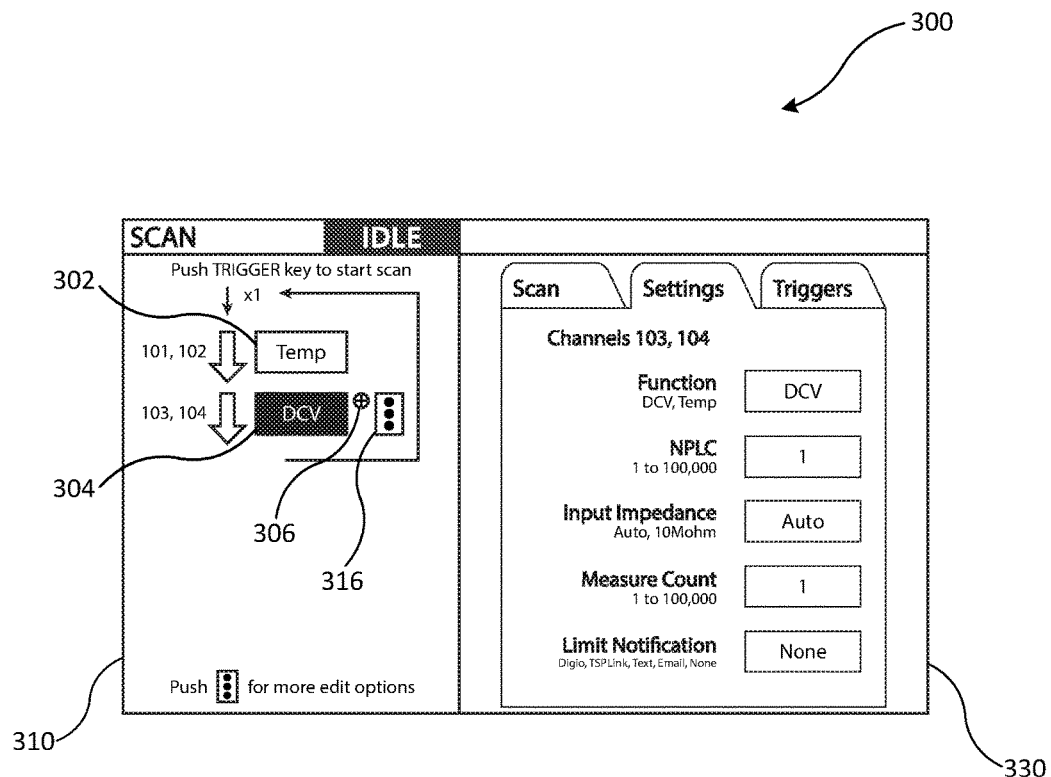
FIG. 5 is a depiction of an example user interface displaying views of a graphical scan summary according to scan groups with subgroups and a settings summary, according to embodiments of the present disclosure.

The DAQ system 100 may further generate scan subgroups based on divergences between the channel setting values for the channels in each scan group. The DAQ system 100 then renders icons, which visually indicate that the specific scan group contains multiple scan subgroups, for every scan group containing multiple scan subgroups. The DAQ system 100 may take into consideration different types of channel settings and the numerical or other variations of the channel setting values to create scan groups and subgroups. FIG. 5 shows another example embodiment of the scan screen 300 with four channels similar to the scan configuration of FIG. 4, but the channels 101, 102, 103, and 104 have been further set up to include maximum limits as one of their channel settings. Like the scan screen 200 of FIG. 4, the scan screen 300 in FIG. 5 includes a graphical scan summary 310 on the left, but then shows a channel settings view 330 on the right, rather than the scan configuration view 220. Because there are divergent channel setting values for channels 103 and 104, the DAQ system 100 has determined that the DCV scan group contains scan subgroups. The DAQ system 100 has rendered scan groups 302, 304 according to the measurement types of the channels on the graphical scan summary 310.

The channel settings for a channel may include both primary channel settings and secondary channel settings. Secondary channel settings for a scan subgroup are those that do not need to be consistent across a scan group, such as a maximum limit, for example. Which channel settings are primary or secondary may be according to the automatic channel setting generation discussed above. Additionally or alternatively, the user may customize which channel setting types are primary or secondary. The DAQ system 100 may include algorithms for determining whether a channel setting should be a primary channel setting for the scan groups or secondary channel setting for the scan subgroups. These algorithms may be customizable by the user.

The DAQ system 100 may base the group assignments for channels on only those channel settings that are categorized as primary, ignoring divergences among channel settings deemed to be secondary. The DAQ system 100 may base the subgroup assignments for channels on both divergences of secondary channel setting values and the group assignment. If group assignment is allocated to channels as a type of channel setting, discussed in further detail below, the group assignment may be considered a secondary channel setting since the DAQ system 100 may look to divergences in group assignment values to determine the scan subgroups.

For the example scan configuration of FIG. 5, Table A, below, shows the channel setting values of the measurement type and maximum limits set for each of the channels in the example setup described above.

TABLE A

| Channel | Primary Channel Settings Measurement Type | Secondary Channel Settings Maximum Limit |
|---|---|---|
| 101 | Temp | 23 degrees |
| 102 | | |
| 103 | DCV | 12.7 V |
| 104 | | 5.5 V |

Within the temperature scan group, all the channels have identical channel settings (i.e., no divergent secondary channel setting values). Specifically, channels 101 and 102 have each been set up with a maximum limit channel setting of 23 degrees. No further scan subgroups will be determined for a scan group with channels having no divergent channel settings. So, the DAQ system 100 will not generate multiple scan subgroups for the temperature scan group, as shown in FIG. 5. Within the DCV scan group, because channel 103 has a maximum limit channel setting of 12.7 V and channel 104 has a maximum limit channel setting of 5.5 V, the processor 108 will generate two scan subgroups based on the divergent secondary channel setting values. The DAQ system 100 then renders the graphical scan summary 310 on the display 110. Because the DAQ system 100 has determined that the DCV scan group 304 contains subgroups, a subgroup indication icon 306 has been rendered adjacent to scan group 304. Thus, if the user meant for all the channels with DCV as their measurement type to have the same maximum limit, the rendered graphical scan summary 310 of the DAQ system 100 immediately alerts the user to the divergent maximum limit channel setting values for the DCV channels. This allows the user to quickly set up scan configurations for compiling data from the test and measurement device 102 using the DAQ system 100.

When the user reviews the graphical screen summary 310 and sees that a scan group contains channels with divergent channel settings by the multiple subgroup indication icon 306, the user may change the channel settings to be non-divergent. The user may change the channel settings of channels in a scan group from the scan screen 300 by selecting the scan group on the graphical screen summary 310 and using the channel settings view 330. For example, FIG. 5 shows that the user has selected the DCV scan group 304, which has caused the right portion of the scan screen 300 to switch to the channel settings view 330 for the channels in scan group 304. In the channel settings view 330, a listing of the channels within the selected scan group 304 may be seen at the top with configurable settings listed below including measurement type, number of power line cycles, input impedance, measure count, and limit notification, for example.

Figure 6:
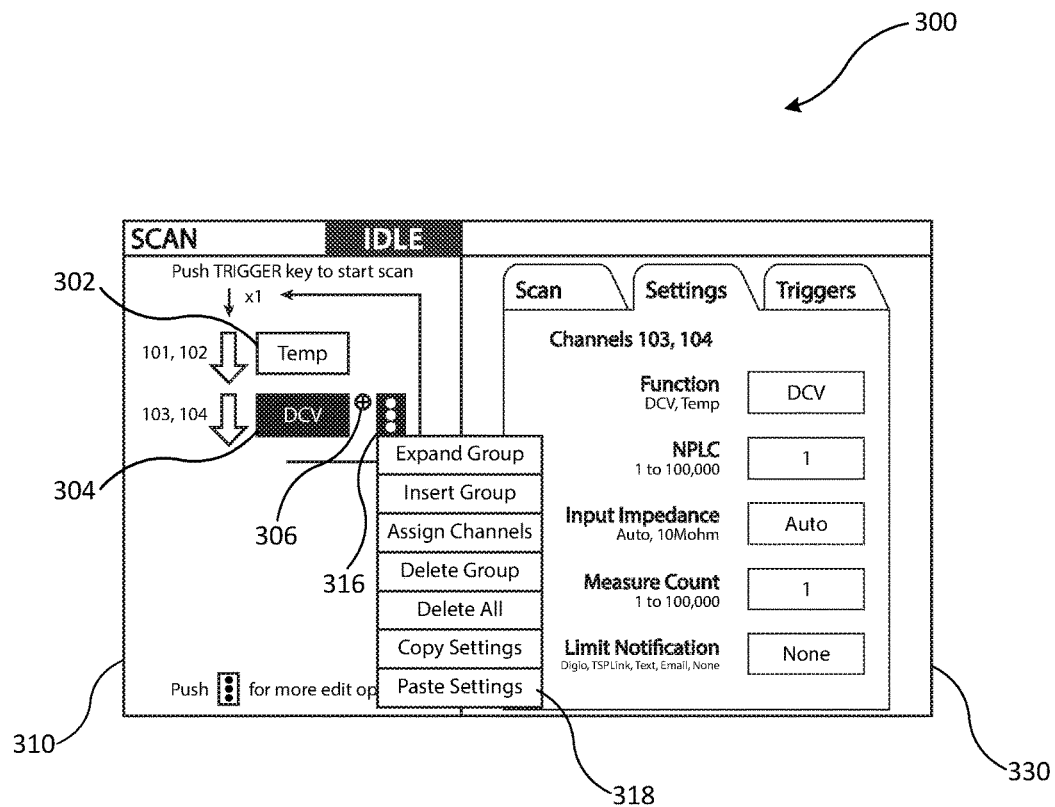
FIG. 6 is a depiction of the user interface of FIG. 5 with an editing menu open, according to embodiments of the present disclosure.

To edit the scan groups or channel settings, the user may also select the editing icon 316 on the graphical scan summary 310. FIG. 6 shows the scan screen 300 of FIG. 5 with the editing icon 316 selected, which brings up a group menu 318. The group menu 318 includes selectable options for expanding the scan group, inserting a scan group, assigning channels to the scan group, deleting the scan group, deleting all of the scan groups, and copying the common channel settings of the channels within the scan group, as seen in FIG. 6.

Figure 7:
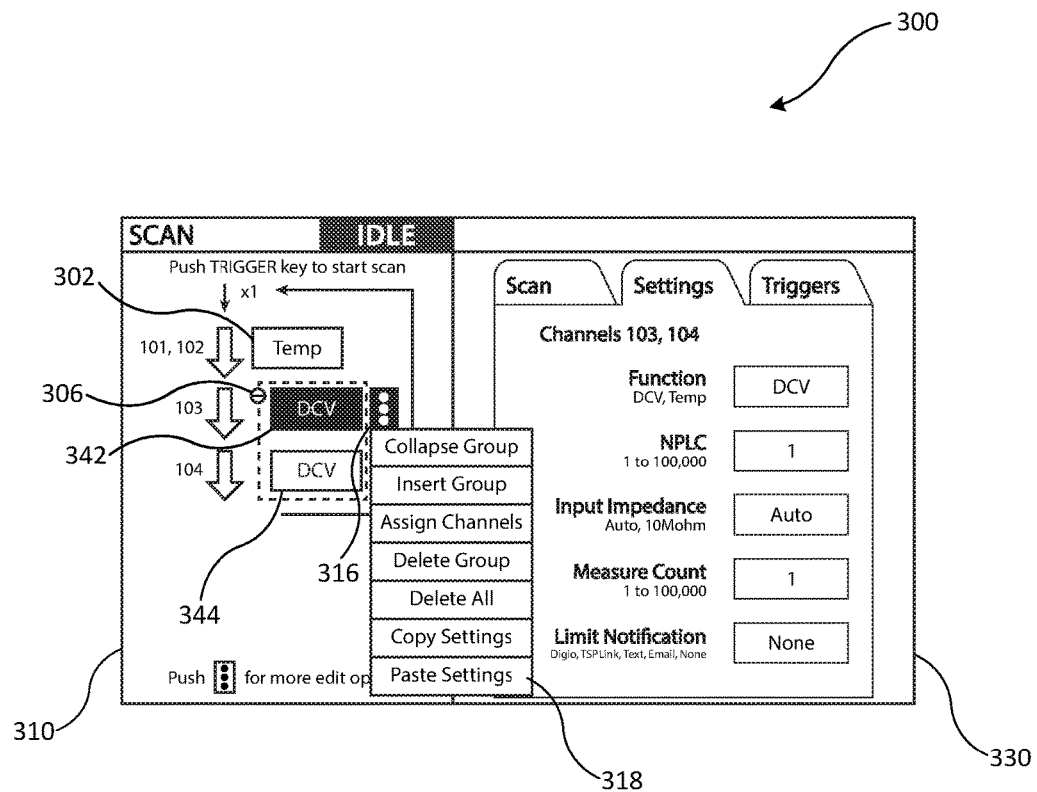
FIG. 7 is a depiction of the user interface of FIGS. 5-6 with the scan group expanded into scan subgroups, according to embodiments of the present disclosure.

FIG. 7 shows the scan screen 300 of FIG. 6, with the DCV scan group 304 expanded showing scan subgroups in response to the user's selection of the expand group option. The subgroup indication icon 306 may also be selectable by the user to expand and collapse a scan group to show or hide scan subgroups. When the subgroup indication icon 306 is selected by the user, the DAQ system 100 renders the scan subgroups for the particular scan group selected on the scan screen 300 of the display 110. In FIG. 7, the DAQ system 100 has rendered the scan subgroups 342, 344 that the DAQ system 100 generated based on the divergent channel settings of channels 103 and 104, as described above. With the scan group 304 expanded to show the scan subgroups 342, 344, the subgroup indication icon 306 has been re-rendered to indicate all of the scan subgroups that are within the scan group and that the scan subgroups are collapsible.

Additionally or alternatively to the primary and secondary channel settings approach described above, the DAQ system 100 may include a hierarchy for some or all of the channel settings, such that the DAQ system 100 generates the group assignment based on any divergences in the channel settings with the highest rank. The DAQ system 100 may then generate subgroup assignments based on further divergences of the channel settings down the hierarchy. Divergences between channel settings not ranked in the hierarchy may be completely ignored when generating groups and subgroups.

The DAQ system 100 may assign group and subgroup assignments to channels by creating additional channel settings for the channels containing the group and subgroup assignments. For example, any channel included in the scan list for the scan configuration may automatically have both a group and subgroup assignment channel setting created. The default value for the group and subgroup assignment may be 1 or 0, for example. As channels are added to the scan list, whether explicitly or implicitly, the DAQ system 100 compares the channel settings of the last added channel to the channel settings of the previously added channels. If a particular primary channel setting, such as measurement type or transducer type, of the channel being added (e.g., channel 205) is divergent from the channel settings for the channels already in the scan list (e.g., channels 201-204), the DAQ system 100 may update the value of the group assignment channel setting to be 2, rather than the default value. If the next channel added to the scan list (e.g., channel 206) also has a divergent primary setting, but the channel settings for next channel added (e.g., channel 206) are the same as the last added channel (e.g., channel 205), the group channel setting of the next channel added (e.g., channel 206) may also be updated to 2, to reflect the similarity of the channel settings of the last two channels added to the scan list (e.g., channels 205 and 206). The subgroup channel setting may be based on the group channel setting, such that if the group assignment is 2, the subgroup default assignment is 2.1. Further, if channels 205 and 206 have divergent secondary channel settings (e.g., a maximum limit of 12 V for channel 205 and a maximum limit of 2 V for channel 206), the DAQ system 100 may change the default value of the subgroup channel setting to 2.2. Thus, the DAQ system 100 may render the graphical scan summary on the display 110 based on the group and subgroup assignments in the channel settings and may update the rendering as those channel settings are changed and/or more channels are added to the scan list. For example, if all channels in a group (e.g., group 2) have the same subgroup assignment (e.g., 2.1), the DAQ system 100 will not render a subgroup icon indicating subgroups because all channels in the group (e.g., group 2) share the same default subgroup (e.g., 2.1).

Alternatively, the DAQ system 100 may only keep group and subgroup assignments in the buffer memory for rendering the graphical scan summary on the display 110, rather than storing the group and subgroup assignments as channel settings in the memory 106. Moreover, the DAQ system 100 may apply any method of keeping track of groups and subgroups for channels that will work with the particular setup.

The DAQ system 100 may further include algorithms for determining whether a difference between divergent channel settings values is sufficiently divergent, such as by using a divergence threshold, for example. These algorithms may be customizable by the user. The divergence threshold may be based on a percent difference between numerical values and/or other programmed algorithms, including those involving alphanumeric characters or other symbols, for example. In this way, the DAQ system 100 manages the definitions of identical and similar for use in determining the scan groups of channels.

The DAQ system 100 may generate the subgroup assignment for a channel based on both the channel settings and the group assignment, looking only at the secondary channel settings and ignoring numerical divergences that do not overcome the divergence threshold. Additionally or alternatively, the generation of group assignment and subgroup assignment may both be subject to a divergence threshold.

For example, a scan may be configured similarly to the previous examples with channels 101, 102, 103, and 104 in the scan list. In this example, however, the maximum limit channel setting for channel 103 is 12.320 V, and the maximum limit channel setting for channel 104 is 12.321 V, as shown in Table B, below. So, the numerical values for the maximum limits are essentially the same or very similar, instead of identical. This minor divergence in the maximum limit channel setting values could have resulted from noise in the test and measurement device 102, causing subtle, unintended differences during setup of the maximum limit channel settings for the channels.

TABLE B

| Channel | Primary Channel Settings Measurement Type | Secondary Channel Settings Maximum Limit |
| --- | --- | --- |
| 101 | Temp | 23 degrees |
| 102 | | |
| 103 | DCV | 12.320 V |
| 104 | | 12.321 V |

In the present example, the DAQ system 100 would not generate separate scan subgroups for channels 103 and 104 because the maximum limit channel setting values for each channel would not register as divergent. The processor 108 and/or the comparator 112 may determine whether the values of a particular channel setting for two channels are divergent by comparing the difference against the divergence threshold. The divergence threshold is stored in the memory 106 and may be vary based on the values of the channel setting and/or may vary depending on the type of channel setting. This divergence threshold of the DAQ system 100 may also be used by the comparator 112 when the processor 108 generates scan groups using the primary channel settings. For example, if two channels are both configured with temperature as their measurement type channel setting, but each use a different transducer types and/or have different slot numbers, the DAQ system 100 may combine the two channels into a single scan group rather than multiple separate scan groups. The types of divergences that the DAQ system 100 ignores may be customized by the user on both the scan group and subgroup levels.

In another non-limiting example embodiment, the DAQ system 100 may include device drivers for test and measurement devices 102. The DAQ system 100 may query the test and measurement devices 102, with which the DAQ system 100 is in communication, to determine information related to device type, state, device parameters, channels, measurement type, and additional channel settings. Based on this information, the DAQ system 100 may automatically generate channel settings for the channels. The DAQ system 100 graphically renders the scan screen 300 to make clear how the test and measurement devices 102 have been configured and what they are going to do.

In yet another non-limiting example embodiment, the DAQ system 100 automatically sifts through the channel settings for all channels and builds up scan groups based on the identity and similarity of the channel setting. Initially, the DAQ system 100 assigns all channels with identical settings to the same scan group (i.e., generates the same group assignment for those channels). Some channels settings, such as maximum limits, may be unique to a particular channel. The DAQ system 100 does not simply render a separate scan group for each channel with unique channel settings, however. The DAQ system 100 determines how to combine the channels and scan groups without identical settings based on the similarity between the channel settings. For example, channels with identical measurement types but different limits may be grouped together into the same scan group based on the measurement type. Similarly, channels with the same measurement type, but with different slot number and/or transducer type may be grouped together into the same scan group based on the measurement type. The DAQ system 100 then renders the generated scan groups on the display 110.

Figure 8:
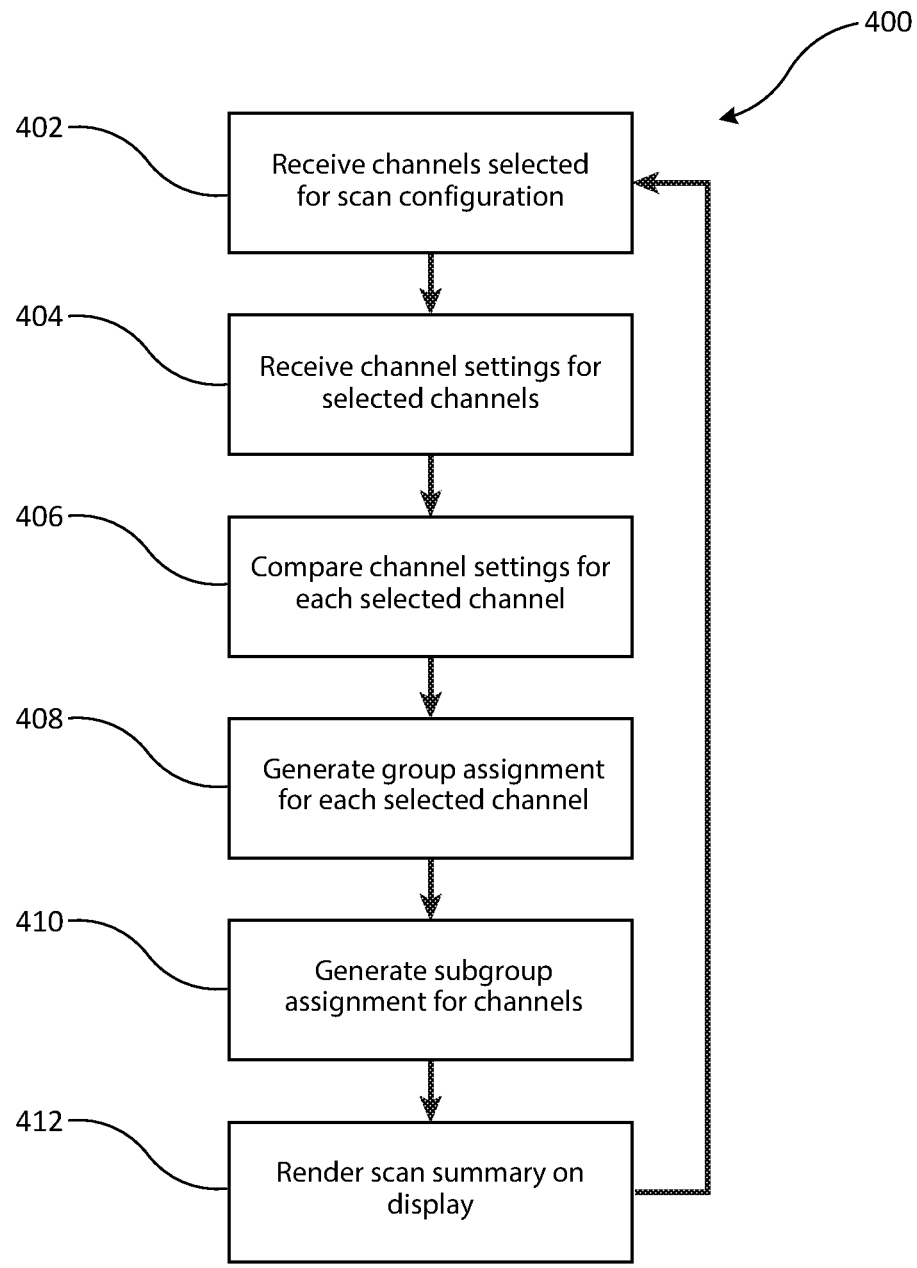
FIG. 8 is a flow diagram of an example method for determining and rendering scan groups and subgroups, according to embodiments of the present disclosure.

FIG. 8 shows a block diagram of a basic method that the DAQ system 100 may undertake to generate and render scan groups. The DAQ system 100 may generate scan groups based on the scan configuration information. First, as seen in blocks 402 and 404 in FIG. 8, the DAQ system 100 may receive the channels selected for the scan and the corresponding channels settings for each channel selected. Block 406 represents the DAQ system 100 comparing the channel settings for each channel selected. In block 408, the DAQ system 100 then generates a group assignment for each channel selected for the scan in the scan list of the scan configuration. In block 410, the DAQ system 100 generates a subgroup assignment for each channel selected based on both the channel settings and the group assignment for each channel. Channels with channel settings that the DAQ system 100 determines to be divergent are grouped into scan subgroups within their scan group according to those divergent settings. Finally, in block 412, the DAQ system 100 renders the generated scan groups on the UI along with any icons, where needed, indicating that a scan group contains scan subgroups.

The DAQ system may include software and hardware, and operate using a computer, which may be a desktop, laptop, tablet, smart phone, or any other computational instrument. The DAQ software may be stored in a memory medium of the computer or in a mass storage device, such as a hard disk drive, and may include device drivers for the various test and measurement devices. The DAQ system may operate as a virtual instrument for controlling and receiving data from the connected test and measurement devices.

The test and measurement devices in the DAQ system may include an ammeter, voltmeter, ohmmeter, galvanometer, capacitance meter, inductance meter, wattmeter, field mill, magnetometer, EMF meter, electrometer, multimeter, LCR meter, DMM, thermometer, thermocouple, thermistor, oscilloscope, logic analyzer, spectrum analyzer, reflectometer, counter, digital counter, frequency counter, switch, power supply, signal generator, digital pattern generator, pulse generator, signal tracer, pressure transducer, or any other known sensor or laboratory instrument. The test and measurement devices may further include an embedded device or module, such as a parallel port, digital-to-analog converter (DAC), analog-to-digital converter (ADC), multiplexer, nuclear instrumentation module (NIM), transistor-transistor logic (TTL) I/O, serial or RS-232 port, and/or IEEE 488 General Purpose Interface Bus (GPIB) interface for communication, for example.

The DAQ system may include a memory buffer (e.g., non-volatile wrap-around reading memory) for allowing continuous, unattended data logging over long periods. The buffer may transfer data to a PC controller automatically as new data is acquired or manually according to predetermined event triggers set by the user. The DAQ system may also include a switch for opening and closing the connected channels and a clock or timer (not shown) for providing timestamp data or tracking time.

To allow for use in mixed signal testing and measurement applications with multi-point monitoring, the DAQ system may include a multi-channel differential multiplexer and/or matrix module or other switch for multiplexing many input signals into a single output signal for the test and measurement device. The multi-channel multiplexer module includes screw terminals, pins, or other connector types for connecting or wiring the transducers to measure the physical properties of the phenomenon under testing, where each pin represents a channel for data transfer. The channels may all be configurable to 2-pole or 4-pole relay inputs, and the relays may be reed, latching electromechanical, or other known high-speed relay types. The multi-channel multiplexer module may include built-in cold junction compensation (CJC) sensors for automatically linearizing connected thermocouples. Closing a particular channel on the multiplexer allows the DMM or other test and measurement device to receive the measurement signals from the transducer connected to that channel. Certain channels of the multiplexer may be reserved or protected for control signals, for providing current, or for other operations.

Channel settings for a channel may include data such as:
(1) channel label, address, and/or number;
(2) slot or card number;
(3) measurement type or function for the channel (e.g., temperature, (alternating or direct) current, voltage, direct current voltage (DCV), alternating current voltage, electric potential, (2-wire or 4-wire) resistance, capacitance, (electrical, intrinsic, or wave) impedance, inductance, power ratio, continuity, (electrical or thermal) conductivity, dielectric, permittivity, charge, (electric or magnetic) field, magnetic flux, permeability, frequency, period, absorption, emission, force, light intensity, reflectivity, radiance, refraction, opacity, luminescence, color, position, flow, or viscosity);
(4) sensor or transducer type (e.g., a resistance temperature detector (RTD), strain gauge, thermistor, photodiode, piezoelectric sensor, thermocouple, Hall effect sensor, microphone, Geiger-Müller tube, or pH probe);
(5) thermocouple wire type (e.g., type B, E, J, K, N, R, or S);
(6) CJC type;
(7) RTD type;
(8) thermistor type;
(9) measurement units (e.g., volts, amps, ohms, decibels, or degrees);

(10) measurement resolution or precision (i.e., number of digits to include);
(11) measurement format;
(12) channel type (i.e., analog or digital);
(13) differential or single ended measurement;
(14) relay type (e.g., latching electromechanical, dry reed, FET solid-state);
(15) input impedance;
(16) signal conditioning (e.g., autozeroing, gain, offset compensation, and/or filtering) to remove signal noise or other errors;
(17) calculations (i.e., how a measurement is processed and returned using various mathematical functions);
(18) limit (i.e., maximum or minimum measurement value);
(19) range type (e.g., automatic or manual);
(20) range (i.e., high and low thresholds for measurement value);
(21) range format;
(22) alarm limit for crossing thresholds (i.e., ON or OFF), may have multiple set per channel;
(23) alarm type or setting (i.e., what happens when a threshold is crossed);
(24) alarm notification setting (e.g., Digio, text message, e-mail, none);
(25) alarm status format;
(26) trigger type and/or source (e.g., analog, digital, front panel, channel, external, internal, upper or lower threshold);
(27) trigger, sweep, and/or sample count;
(28) trigger and/or channel delay;
(29) integration rate (i.e., number of power line cycles (PLCs) to wait to take the measurement) (e.g., automatic or manual);
(30) speed;
(31) frequency gate time;
(32) HI/LO limits;
(33) low impedance;
(34) time stamp format (e.g., date, time, time elapsed since start of scan or measurement);
(35) secondary measurement; and/or
(36) monitoring, counter, and/or totalizer mode.

The channel settings may also include other parameters not listed here and/or exclude any listed.

Aspects of the invention may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the invention may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, random access memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the invention, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may include computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, radio frequency (RF), infrared, acoustic or other types of signals.

The aspects of the present disclosure are susceptible to various modifications and alternative forms. Specific aspects have been shown by way of example in the drawings and are described in detail herein. However, it should be noted that the examples disclosed herein are presented for the purposes of clarity of discussion and are not intended to limit the scope of the general concepts disclosed to the specific aspects described herein unless expressly limited. As such, the present disclosure is intended to cover all modifications, equivalents, and alternatives of the described aspects in light of the attached drawings and claims.

References in the specification to aspect, example, etc., indicate that the described item may include a particular feature, structure, or characteristic. However, every disclosed aspect may or may not necessarily include that particular feature, structure, or characteristic. Moreover, such phrases are not necessarily referring to the same aspect unless specifically noted. Further, when a particular feature, structure, or characteristic is described in connection with a particular aspect, such feature, structure, or characteristic can be employed in connection with another disclosed aspect whether or not such feature is explicitly described in conjunction with such other disclosed aspect.

EXAMPLES

Illustrative examples of the technologies disclosed herein are provided below. An embodiment of the technologies may include any one or more, and any combination of, the examples described below.

Example 1 includes a method for configuring a scan for a test and measurement device, the method comprising: receiving, into a memory of the test and measurement device, a scan list of channels to be included in the scan; receiving, into the memory of the test and measurement device, channel settings for each channel in the scan list; comparing, with a comparator of the test and measurement device, the channel settings for each channel in the scan list; generating, with a processor of the test and measurement device, a group assignment for each channel in the scan list, the group assignment generated based on the channel settings for each channel; and rendering a graphical summary of the scan on a display of the test and measurement device, the graphical summary including one or more group icons representing each group assignment for the scan list.

Example 2 includes aspects of example 1, further comprising: generating, with the processor of the test and measurement device, a subgroup assignment for each channel in the scan list, the subgroup assignment generated based on the group assignment and the channel settings for each channel; and rendering the graphical summary of the scan on the display, the graphical summary further including a subgroup icon adjacent each group icon representing channels with differing subgroup assignments.

Example 3 includes aspects of examples 1-2, wherein generating the subgroup assignment for each channel comprises generating the subgroup assignment based on the channel settings related to maximum, minimum, and label.

Example 4 includes aspects of examples 1-2, wherein comparing the channel settings for each channel comprises comparing a difference, between non-identical channel settings, against a divergence threshold, and wherein generating the subgroup assignment comprises generating non-identical subgroup assignments when the difference is greater than the divergence threshold.

Example 5 includes aspects of example 1, wherein generating the group assignment for each channel comprises generating the group assignment based on the channel settings related to measurement type, range, transducer type, and measurement length.

Example 6 includes aspects of example 5, wherein generating the group assignment for each channel comprises generating the group assignment based on the channel settings related to measurement type.

Example 7 includes aspects of example 1, wherein receiving the scan list of channels comprises receiving the channels from the memory based on manual interactions with the test and measurement device during a debug mode.

Example 8 includes aspects of example 1, wherein receiving the channel settings for each channel comprises receiving the channels settings from the memory based on manual interactions with the test and measurement device during a debug mode.

Example 9 includes aspects of example 1, wherein receiving the scan list of channels comprises receiving the scan list of channels through a remote bus.

Example 10 includes aspects of example 1, wherein receiving the channel settings for each channel comprises receiving the channel settings through a remote bus.

Example 11 includes a data acquisition system for scanning channels and storing measurements, the data acquisition system comprising: one or more channel inputs to receive measurement signals according to channel; a memory to store a scan list of channels selected for a scan, channel settings for each channel in the scan list, and measurements according to the measurement signals received through the one or more channel inputs; a processor, in communication with the memory, to generate a scan configuration, the scan configuration including: the scan list of channels, and a set of groups of channels in the scan list, each group, in the set of groups, generated by the processor based on the channel settings for each channel in the scan list; and a display, in communication with the processor, to render the set of groups of the scan configuration.

Example 12 includes aspects of example 11, in which the scan configuration further includes: a set of subgroups of channels within each group of the scan configuration, each subgroup, in the set of subgroups, generated by the processor based on the channel settings for each channel within the group; and a subgroup indication, rendered on the display, adjacent each rendered group containing a set of subgroups with multiple subgroups.

Example 13 includes aspects of examples 11-12, wherein the set of subgroups is generated based on the channel settings related to maximum, minimum, and label.

Example 14 includes aspects of examples 11-12, further comprising a comparator for outputting a divergence signal to the processor upon determining that a difference, between non-identical channel settings, is greater than a divergence threshold, the processor further configured to, upon receiving the divergence signal from the comparator, generate non-identical subgroups for the channels with non-identical channel settings within the group.

Example 15 includes aspects of example 11, wherein the set of groups is generated based on the channel settings related to measurement type, range, transducer type, and measurement length.

Example 16 includes aspects of example 15, wherein the set of groups is generated based on the channel settings related to measurement type.

Example 17 includes aspects of example 11, wherein the scan list of channels is stored in the memory based on manual interactions with the data acquisition system during a debug mode.

Example 18 includes aspects of example 11, wherein the channel settings for each channel are stored in the memory based on manual interactions with the data acquisition system during a debug mode.

Example 19 includes aspects of example 11, wherein the scan list of channels is received through a remote bus.

Example 20 includes aspects of example 11, wherein the channel settings for each channel are received through a remote bus.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Although specific aspects of the invention have been illustrated and described for purposes of illustration, it will be understood that various modifications may be made without departing from the spirit and scope of the invention. Accordingly, the invention should not be limited except as by the appended claims.

What is claimed is:

1. A method for configuring a scan for a test and measurement device, the method comprising:
   receiving, into a memory of the test and measurement device, a scan list of channels to be included in the scan;
   receiving, into the memory of the test and measurement device, channel settings for each channel in the scan list;
   comparing, with a comparator of the test and measurement device, the channel settings for each channel in the scan list;
   generating, with a processor of the test and measurement device, a group assignment for each channel in the scan list, the group assignment generated based on the channel settings for each channel; and
   rendering a graphical summary of the scan on a display of the test and measurement device, the graphical summary including one or more group icons representing each group assignment for the scan list.

2. The method of claim 1, further comprising:
   generating, with the processor of the test and measurement device, a subgroup assignment for each channel in the scan list, the subgroup assignment generated based on the group assignment and the channel settings for each channel; and
   rendering the graphical summary of the scan on the display, the graphical summary further including a subgroup icon adjacent each group icon representing channels with differing subgroup assignments.

3. The method of claim 2, wherein generating the subgroup assignment for each channel comprises generating the subgroup assignment based on the channel settings related to maximum, minimum, and label.

4. The method of claim 2, wherein comparing the channel settings for each channel comprises comparing a difference, between non-identical channel settings, against a divergence threshold, and wherein generating the subgroup assignment comprises generating non-identical subgroup assignments when the difference is greater than the divergence threshold.

5. The method of claim 1, wherein generating the group assignment for each channel comprises generating the group assignment based on the channel settings related to measurement type, range, transducer type, and measurement length.

6. The method of claim 5, wherein generating the group assignment for each channel comprises generating the group assignment based on the channel settings related to measurement type.

7. The method of claim 1, wherein receiving the scan list of channels comprises receiving the channels from the memory based on manual interactions with the test and measurement device during a debug mode.

8. The method of claim 1, wherein receiving the channel settings for each channel comprises receiving the channels settings from the memory based on manual interactions with the test and measurement device during a debug mode.

9. The method of claim 1, wherein receiving the scan list of channels comprises receiving the scan list of channels through a remote bus.

10. The method of claim 1, wherein receiving the channel settings for each channel comprises receiving the channel settings through a remote bus.

11. A data acquisition system for scanning channels and storing measurements, the data acquisition system comprising:
    one or more channel inputs to receive measurement signals according to channel;
    a memory to store a scan list of channels selected for a scan, channel settings for each channel in the scan list, and measurements according to the measurement signals received through the one or more channel inputs;
    a processor, in communication with the memory, to generate a scan configuration, the scan configuration including:
      the scan list of channels, and
      a set of groups of channels in the scan list, each group, in the set of groups, generated by the processor based on the channel settings for each channel in the scan list; and
    a display, in communication with the processor, to render the set of groups of the scan configuration.

12. The data acquisition system of claim 11, in which the scan configuration further includes:
    a set of subgroups of channels within each group of the scan configuration, each subgroup, in the set of subgroups, generated by the processor based on the channel settings for each channel within the group; and
    a subgroup indication, rendered on the display, adjacent each rendered group containing a set of subgroups with multiple subgroups.

13. The data acquisition system of claim 12, wherein the set of subgroups generated based on the channel settings related to maximum, minimum, and label.

14. The data acquisition system of claim 12, further comprising a comparator for outputting a divergence signal to the processor upon determining that a difference, between non-identical channel settings, is greater than a divergence threshold, the processor further configured to, upon receiving the divergence signal from the comparator, generate non-identical subgroups for the channels with non-identical channel settings within the group.

15. The data acquisition system of claim 11, wherein the set of groups is generated based on the channel settings related to measurement type, range, transducer type, and measurement length.

16. The data acquisition system of claim 15, wherein the set of groups is generated based on the channel settings related to measurement type.

17. The data acquisition system of claim 11, wherein the scan list of channels is stored in the memory based on manual interactions with the data acquisition system during a debug mode.

18. The data acquisition system of claim 11, wherein the channel settings for each channel are stored in the memory based on manual interactions with the data acquisition system during a debug mode.

19. The data acquisition system of claim 11, wherein the scan list of channels is received through a remote bus.

20. The data acquisition system of claim 11, wherein the channel settings for each channel are received through a remote bus.

* * * * *